United States Patent [19]

Hartwell

[11] 4,277,869
[45] Jul. 14, 1981

[54] STABILIZER

[76] Inventor: Charles A. Hartwell, 2923 Freshmeadows, Houston, Tex. 77063

[21] Appl. No.: 61,904

[22] Filed: Jul. 30, 1979

[51] Int. Cl.³ .................. B21D 53/10; F16C 1/26
[52] U.S. Cl. .................. 29/149.5 R; 29/149.5 NM; 308/4 A; 308/239; 166/173; 166/241; 175/325; 175/323; 175/408
[58] Field of Search .............. 29/149.5 S, 149.5 NM, 29/149.5R; 308/4 A, 239; 166/173, 241; 175/325, 323, 408

[56] References Cited

U.S. PATENT DOCUMENTS

| | | | |
|---|---|---|---|
| 2,293,997 | 8/1942 | Neuhaus | 29/149.5 R |
| 2,334,350 | 11/1943 | Neuhaus | 308/4 |
| 3,054,647 | 9/1962 | Von Rosenberg | 308/4 A |
| 3,268,274 | 8/1966 | Ortloff et al. | 308/4 A |
| 3,306,381 | 2/1967 | Garrett et al. | 175/346 |
| 3,454,308 | 7/1969 | Kennedy | 308/4 A |
| 3,938,853 | 2/1976 | Jürgens et al. | 308/4 A |
| 3,945,446 | 3/1976 | Ostertag | 308/4 A |
| 3,978,933 | 9/1976 | Olson et al. | 308/4 A |
| 3,993,368 | 11/1976 | Jürgens et al. | 308 4 A/ |
| 4,000,549 | 1/1977 | Bromley et al. | 308/4 A |
| 4,011,918 | 3/1977 | Jürgens | 308/4 A |
| 4,043,611 | 8/1977 | Wallace | 308/4 A |
| 4,060,286 | 11/1977 | Boice | 308/4 A |
| 4,081,203 | 3/1978 | Fuller | 308/4 A |

*Primary Examiner*—Nicholas P. Godici
*Assistant Examiner*—V. K. Rising
*Attorney, Agent, or Firm*—Gunn, Lee & Jackson

[57] ABSTRACT

An improved stabilizer is disclosed. In the preferred and illustrated embodiment, a built-up spline is disclosed. The spline is made by drilling a set of holes in a blank of relatively soft metal and inserting hardened inserts into the metal. Typical inserts are made of tungsten carbide. They may be brazed on the back side to firmly affix the inserts in holes drilled in the metal strip. The metal strip is welded to the stabilizer body. It has the advantage in that it can be refaced or built up after wear.

8 Claims, 5 Drawing Figures

STABILIZER

BACKGROUND OF THE DISCLOSURE

In drilling an oil well, the drill string normally incorporates several drill collars and stabilizers. The drill pipe, itself, normally does not touch the wall of the drilled hole. The stabilizers, one or more, function to clear the pipe and drill collars from the wall. The stabilizer, however, is intended to touch the wall of the drilled hole to align the hole as it is formed by the drill bit. The stabilizer normally includes lengthwise splines mounted on its exterior which may be straight or helical about the stabilizer. The splines keep the drill string aligned so that the hole is drilled relatively straight, the hole being drilled to a diameter determined by the drill bit. The splines on the stabilizer normally contact the wall of the drilled hole. Because of this contact, the splines eventually wear down, and this necessitates replacement of the stabilizer from time to time.

A very expensive solution to wearing of stabilizers has been devised in the past. The entire stabilizer is formed from a single bar or heavy wall tubing of hardened alloy steel such as 4140-4145 steel. The external surface is milled away to leave the splines along the external surface of the stabilizer. This is a very expensive procedure in that a tremendous amount of machine time is required for the milling operation, and the milling operation, itself, is slow because the bar is a relatively hard alloy steel. It has the advantage, however, of a very strong root connection between the spline and body. This is particularly valuable because it prevents fracture along the root and separation of the spline from the stabilizer body.

Another form of stabilizer is obtained by utilizing a spline which is manufactured separate from the stabilizer body to decrease machining costs. The spline is later welded to the stabilizer body, achieving more than an adequate financial tradeoff in the cost of fabrication.

Even with the stabilizer formed from a bar or heavy wall tubing of heat treated alloy steel, it eventually becomes necessary to weld hard surfacing (wear resistant) material across the spline. Even with the best grade of hard surfacing, the spline will wear away. One solution begins with the step of drilling holes in the spline and pressing cylindrical or serrated cylindrical inserts of a hardened material into the holes. One material is tungsten carbide particles in an alloy matrix support metal formed into a suitable insert. This adds tremendous wear life to the stabilizer.

When the tungsten carbide inserts are pressed into predrilled holes, even when they are assembled with an interference fit, the inserts can still sometimes come out, typically occurring in the following circumstances. After many hours of usage, the splines and the protective tungsten carbide inserts are worn down, and the wear manifests itself in a reduction of height on the outer diameter of the stabilizer. One manner of correction of this problem is to weld an overlay of hard surfacing onto the exposed or outer face of the spline, even over the inserts. One such overlay material utilizes welding material with tungsten carbide particles in it so that the built-up layer on top of the spline is abrasive resistant. This is accomplished in either a welding or bonding process which requires heating of the spline. The alloy supported tungsten carbide placed on the face is bonded to the spline in a procedure accompanied by heating of the spline. The difficulty with this is that the tremendous amount of heat applied to the spline creates severe problems. The heating does not alter the tungsten carbide insert, itself, but it creates forces and stresses within the spline which may cause the spline to expel the tungsten carbide insert. One explanation is that the tungsten carbide inserts, when pressed into a drilled hole, sometimes trap moisture and air under the insert. When the spline is heated in the refacing process, the air, water and other gases expand and pressurizes the insert to an extent that it is expelled. In some instances, inserts have been fired from the drilled holes in the fashion of a rifle bullet with equal danger. This makes the process of redressing the face of the spline dangerous for splines with pressed-in inserts.

BRIEF DESCRIPTION OF THE DISCLOSURE

The present invention overcomes the above mentioned problem and offers a spline which has the wearability of high grade, expensive metal stabilizers. The present invention, however, reduces the cost to approach that of less expensive or fabricated stabilizers. Moreover, it constructs a stabilizer with splines which are able to be refaced with abrasive resistant material in safety.

The present invention contemplates a stabilizer which is constructed in the following manner. First of all, a blank for the spline is separately fabricated and then drilled with a number of holes. Each hole is positioned and spaced so that a tungsten carbide insert or other cylindrical insert of hard and abrasive resistant material can be inserted into the drilled hole. The inserts are pressed or driven and then brazed into the drilled hole. Two methods of brazing are used. On the back face, the back end of the insert and the back face of the spline are exposed in one method of brazing. Brazing material is applied over the back surface. Through the use of a furnace, it is then possible to heat the entire strip and thereby braze all of the inserts simultaneously on the back face. This brazing procedure fills any voids which might otherwise be left behind the insert inserted into the drilled hole and, moreover, provides a mechanical grip to the insert which keeps the insert in the drilled hole. Thereafter, the stabilizer strip is welded to the stabilizer body so that the body is then assembled complete with splines. In an alternate method, holes are drilled into the spline, only partially penetrating the spline. The braze material is placed in the holes prior to insertion and heating. Subsequently, when the face of the spline is worn away, it can be redressed by applying refacing material such as a complete facial covering of an alloy matrix supporting tungsten carbide particles. It can be applied with safety, the application process requiring substantial heat. Even though heat is applied, no danger to the welder arises because the inserts are anchored by the braze material.

DETAILED DESCRIPTION OF THE ILLUSTRATED EMBODIMENT

Figure 1:
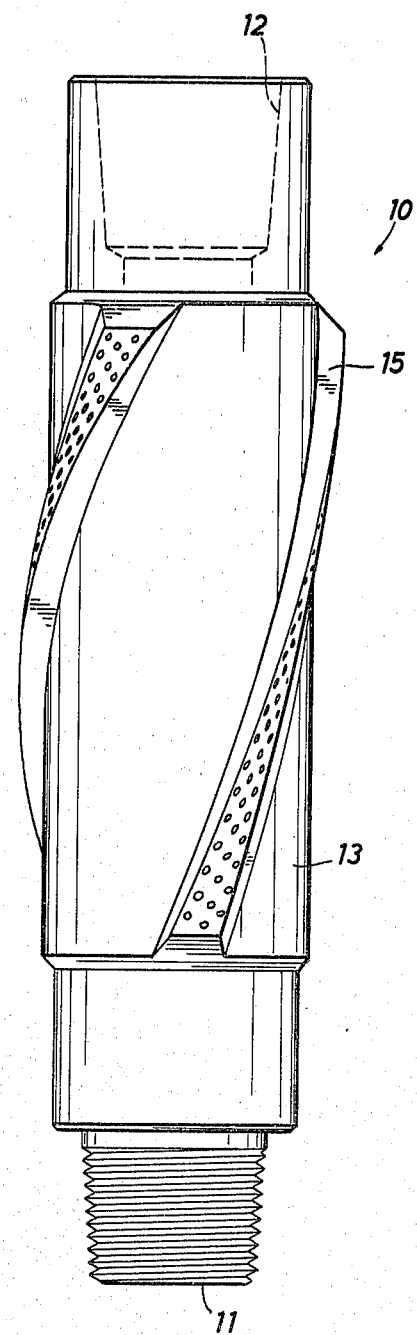
FIG. 1 shows the improved stabilizer of the present invention including cylindrical inserts reinforcing the stabilizer splines along the length thereof to enhance the life of the stabilizer.

Attention is first directed to FIG. 1 of the drawings, where the improved stabilizer of the present invention is illustrated. The stabilizer includes a conventional pin 11 and box 12 at the two ends which enable the apparatus to be connected in a drill string made up of tubular goods formed of API standard components. The stabilizer is axially hollow to conduct drilling mud through it and includes an outer cylindrical body at 13, sometimes having a thick wall. The body 13 supports a first spline 15 and suitable identical splines around the body. The splines can be helical as shown or can be straight along the length of the body. The precise arrangement of the splines and the number of splines on the body is subject to variation.

In drilling operations, the spline is often in contact with the rough and abrasive wall of the drilled hole. When it contacts the hole, it is accomplishing its intended purpose and particularly helps in keeping the hole straight. Moreover, the spline which is affixed to the body is exposed to substantial wear, which wear has the form of abrading away the exposed or outer face of the spline so that it is eventually reduced in size by loss of diameter.

Figure 2:
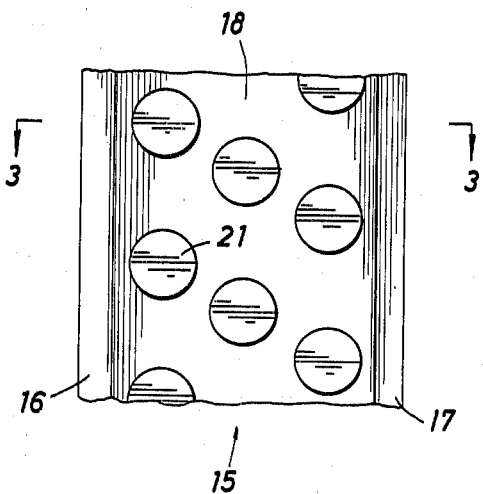
FIG. 2 is an enlarged top face view of a stabilizer spline showing how inserts are positioned on the stabilizer spline with lateral overlap to extend the life of the spline.

In FIG. 2 of the drawings, the spline of the present invention is shown in greater detail. There, it will be observed to have an upstanding wall 16 on one side and a similar wall 17 on the opposite side. The walls can be formed on the spline or by welding. They may taper somewhat inasmuch as a typical spline is narrow at the top and a bit wider at the base. Alternately, the sidewalls can be parallel. Needless to say, the wall shape may vary dependent on the shape of the weld. There is an exposed or outer face 18 which is drilled at suitable locations, one such drilled hole being identified by the numeral 20 in FIG. 3. A cylindrical insert formed of an alloy matrix incorporating tungsten carbide particles is inserted at 21. Several such inserts are placed in multiple holes drilled in the blank of material which comprises the spline. Customary construction of the inserts is a right cylinder with either a smooth or serrated surface. The spline 15 is, in fact, repeatedly drilled in regular locations as shown in FIG. 2. There, the topmost insert is shown to overlap a laterally displaced insert. The overlap is repeated from insert to insert so that no portion of the spline is unprotected by the hardened material. That is to say, the full length of the spline is protected with inserts of hardened material. At the lower end of the spline, the number of inserts may be increased because wear normally is maximum at the lower end.

Figure 3:
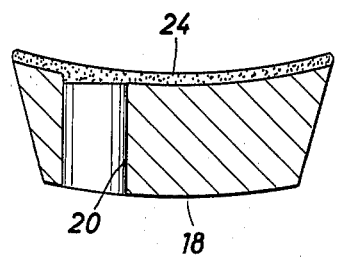
FIG. 3 is a sectional view along the line 3—3 of FIG. 2 showing how a hole is drilled in a spline blank and braze material is applied across the back of it.

In FIG. 3 of the drawings, the body of the spline is drilled with cylindrical holes of selected diameter from the outer or top face 18. The illustrated and described procedure utilizes a hole drilled through the spline. An alternate procedure involves drilling a hole partially through the spline. This is an expedient to reduce the time to drill holes in a thick spline. More will be noted regarding remaining steps in the procedure for partially drilled holes. The drilled hole is assumed to pass through the body of the spline. Preferably, all the holes are drilled as a group, and, after completion of the drilling step, tungsten carbide inserts 21 are inserted into each hole. Preferably, this procedure occurs with the outer or top face 18 positioned on the bottom and the bottom face exposed to apply braze material as explained below. After all of the holes are drilled as a preliminary step, and after plugging the holes with inserts as a secondary step, the next step is to braze the inserts to the spline. While other steps alternatively may be used, braze material as identified at 24 is applied across the entire back face. The braze material is first applied in a cold form; that is to say, it is placed across the surface prior to heating. As will be understood, braze material can be obtained in many forms and can be applied in many patterns. It is preferable to use a form which can be applied across the back face in a cold state. The coating is relatively uniform. These practical limitations can be varied. It should be noted further that FIG. 3 exaggerates the thickness of the braze material for purposes of clarity of the drawings. An important factor is that sufficient braze material is applied across the back face of the spline blank so that all of the inserts and drilled cylindrical holes are adjacent to an adequate or more than adequate quantity of braze material. There may be excess braze material which generally does not impede proper installation. The braze material is thus overlaid in a cold state over many cylindrical holes and inserts. Thereafter, heat is applied as by passing the blank spline material beneath a welding torch at the correct temperature to melt the braze material. An alternate approach is to place the spline and braze material in an oven with a thermostatic setting to achieve the correct temperature.

Figure 4:
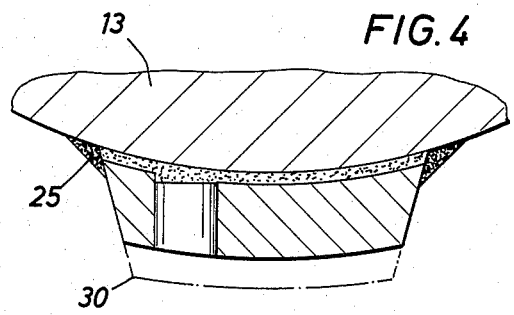
FIG. 4 shows the spline on the stabilizer body with a portion worn away as indicated by dotted line.

In any case, it is heated to a sufficient temperature and for a sufficient duration to melt the braze material and to assure that the braze material makes a good bond with the tungsten carbide inserts and the body of the spline. During heating, the braze material may, in fact, flow in the gap between the insert 21 and the surrounding hole. This depends in large part on the closeness of the fit and other factors such as surface roughness and the like. In any case, the braze material is heated sufficiently so that a good bond is achieved whereby the insert is held firmly to the body of the spline. Thereafter, the spline with affixed inserts is attached by welding as shown in FIG. 4 to the stabilizer body 13. A weld is illustrated at 25, being merely representative of the welds required to affix the spline to the stabilizer body. The weld illustrated in FIG. 4 is representative and may have a different shape and size. The illustration is for clarity and does not necessarily depict the actual weld shape and size. In any case, the spline blank (after attachment of the tungsten carbide inserts) is then attached to the stabilizer body 13 so that the entirety of the stabilizer with splines is assembled in this manner.

Figure 5:
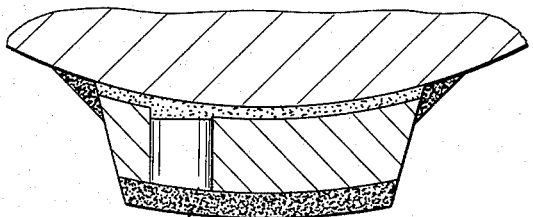
FIG. 5 is a view similar to FIG. 4 showing repair of the stabilizer spline by application of a refacing layer of hard and abrasive resistant material to extend the life of the spline.

The dotted line representation at 30 in FIG. 4 shows a portion of the spline which is worn away through usage, and a portion of the tungsten carbide insert is also worn away. The portion worn away has been exaggerated for clarity; the wear resulting from abrasion may be evenly or unevenly distributed, and it may be slight or extreme. After wear has occurred, the life of the stabilizer can be extended by refacing the stabilizer spline. Refacing is accomplished by applying a layer of supportive metal alloy with tungsten carbide particles in it across the full width of the face. This is shown at 35 in FIG. 5. The layer 35 can be uniform and thick; it may be thin and nonuniform. The procedure for accomplishing this is as follows. After cleaning of the stabilizer spline, a layer of material (typically a relatively soft alloy) supporting tungsten carbide particles is applied across the face by welding. In the application process step, the temperature of the spline is routinely elevated significantly. A suitable bond is developed between the heated refacing material and the spline body proper. More importantly, it is placed over the inserts to the extent that they have been reduced in size. The application of such tremendous levels of heat has heretofore caused accidents as inserts have been literally exploded from the spline body. The present invention, however, holds every insert in position because the inserts have been anchored by brazing. Each insert is held by the braze material which is shown in FIGS. 3, 4 and 5. This braze material serves as a bonding agent which holds the insert against subsequent removal. In particular, the braze material bonds the insert to the body of the spline, and it also fills the cavity of the drilled hole which would otherwise be left partially void. The refacing procedure can be carried out in the field with safety. It particularly does not run the risk of exploding the insert and injurying the workmen who apply the hard facing material.

The present invention enables a spline to be refaced many times. As the hard face material 35 wears away, it can subsequently be replaced ad infinitum.

The materials which can be used in the present invention are worth noting. Instead of utilizing a spline made of metal such as AISI 4140-4340 steel (more expensive and difficult to work and weld), a more readily weldable metal such as AISI 1020-1025 steel can be used for the body of the spline. The tungsten carbide insert is of an alloy such as furnished by several suppliers. The tungsten carbide insert is typically shaped into a round, cylindrical body and is pressed into the drilled hole, the hole and insert having almost no clearance, and, indeed, even an interference fit can be readily used.

Several variations should be noted. One example is the drilling of the holes into the spline. They need not fully penetrate the spline. Indeed, the spline might be quite thick, while the insert is relatively short. In that event, the hole is drilled to a depth leaving some extra space at the bottom of the hole for braze material. The braze material is placed in the hole and the insert positioned above it. The spline is then heated to melt the braze material to form a bond. Because this alternative step may be used, it suggests omission of the braze layer 24 shown in FIG. 3. Other modifications relate to variations in the insert size and relative dimensions. They are shown uniform in size, and this is a convenience in inventory. If desired, the inserts can be varied in diameter and height. Further, serrations on the cylindrical surface enables a better grip to be obtained on the spline body.

The body 13 of the stabilizer can be made of any suitable alloy metal. The braze material is a typical copper alloy braze material.

While the foregoing is directed to the method and apparatus of the present invention, the scope is determined by the claims which follow.

I claim:

1. A method of fabricating a splined stabilizer comprising the steps of:
    (a) forming an opening completely through a metal spline body which opening extends from a front or outer face and intersects a back face of said body;
    (b) positioning an insert of material in said opening which insert is harder than the metal of said metal spline body;
    (c) joining said insert to said spline body at said back face by means of a brazing material; and
    (d) thereafter joining said spline body to a stabilizer body with the back face of said spline body against the stabilizer body.

2. The method of claim 1 including the subsequent step of adding a refacing metal to the outer face of said spline body which step is accomplished by heating said spline body to an elevated temperature to melt said refacing metal to bond to said spline.

3. The method of claim 2 including the further step of positioning at least first and second openings in said spline body positioned to overlap lengthwise of said spline body.

4. The method of claim 1 wherein the hole forming step forms a plurality of holes each extending completely through said spline body which holes overlap lengthwise of said body and pass through said spline body.

5. The method of claim 1 wherein the step of joining said inserts to said spline body includes
    (a) first positioning an unjoined insert in the opening wherein the opening extends fully through the spline body;
    (b) applying an unbonded braze material over the back face of said spline body adjacent to the opening and insert; and
    (c) heating said braze material to melt said braze material sufficiently to bond said insert to said spline body at said back face of said spline body.

6. A method of fabricating a splined stabilizer comprising the steps of:
    (a) forming a plurality of openings in a metal spline body which openings extend from a front or outer face to a back face of said body;
    (b) positioning inserts of material in each of said openings which inserts are harder than the metal of said metal spline body;
    (c) joining said inserts to said spline body by:
        (1) first positioning unjoined inserts in the openings wherein the openings extend fully through the spline body;
        (2) applying an unbonded braze material over the full back face of said spline body adjacent to the openings and inserts; and
        (3) heating said braze material to melt said braze material sufficiently to bond said inserts to said spline body; and
    (d) thereafter joining said spline body to a stabilizer body with the back face of said spline body against the stabilizer body.

7. The method of claim 6 wherein said braze material is applied prior to heating, and the step of heating is accomplished in a furnace heated to a level sufficient to melt and bond said braze material.

8. The method of claim 6 including the subsequent step of adding a refacing metal to the outer face of said spline which step is accomplished by heating said spline body to an elevated temperature to bond said refacing metal to said spline and which step is carried out after attachment of said spline body to the stabilizer.

* * * * *